US012627717B2

(12) United States Patent
Ickin et al.

(10) Patent No.: US 12,627,717 B2
(45) Date of Patent: May 12, 2026

(54) CONTROLLING COMMUNICATIONS FROM CONTENT SERVER TO END DEVICE

(71) Applicant: Telefonaktiebolaget LM Ericsson (publ), Stockholm (SE)

(72) Inventors: Selim Ickin, Stocksund (SE); Tor Kvernvik, Täby (SE); Rafia Inam, Västerås (SE); Burak Demirel, Älvsjö (SE)

(73) Assignee: TELEFONAKTIEBOLAGET LM ERICSSON, (Publ) Stockholm (SE)

( * ) Notice: Subject to any disclaimer, the term of this patent is extended or adjusted under 35 U.S.C. 154(b) by 0 days.

(21) Appl. No.: 17/928,257

(22) PCT Filed: May 29, 2020

(86) PCT No.: PCT/EP2020/064983
§ 371 (c)(1),
(2) Date: Nov. 28, 2022

(87) PCT Pub. No.: WO2021/239250
PCT Pub. Date: Dec. 2, 2021

(65) Prior Publication Data
US 2023/0216907 A1      Jul. 6, 2023

(51) Int. Cl.
H04L 65/1083      (2022.01)
H04L 65/1045      (2022.01)
(Continued)

(52) U.S. Cl.
CPC ...... H04L 65/1083 (2013.01); H04L 65/1045 (2022.05); H04L 65/612 (2022.05); H04L 65/613 (2022.05); H04L 65/80 (2013.01)

(58) Field of Classification Search
CPC ........... H04N 21/44209; H04N 19/164; H04N 21/637; H04N 21/6338; H04N 21/6373;
(Continued)

(56) References Cited

U.S. PATENT DOCUMENTS 9,131,332 B2     9/2015   Newham et al.
11,159,804 B1 *  10/2021  Strowe ................. H04N 19/164
(Continued)

FOREIGN PATENT DOCUMENTS

GB         2423219 A  *  8/2006   ........... H04L 1/0014
WO    WO 2006/086691 A2    8/2006

OTHER PUBLICATIONS

T. Ozcelebi, M. R. Civanlar and A. M. Tekalp, "Minimum delay content adaptive video streaming over variable bitrate channels with a novel stream switching solution," IEEE International Conference on Image Processing 2005, Genova, Italy, 2005, pp. I-209 (Year: 2005).*

(Continued)

*Primary Examiner* — Messeret F Gebre
(74) *Attorney, Agent, or Firm* — Sage Patent Group

(57)                ABSTRACT

Communications from a content server to an end device via a proxy device are controlled. The content server and the proxy device are connected by a first link using a streaming control protocol. The proxy device also has a connection to the end device over a second link. The method includes obtaining information about a context of the end device. The method further includes determining where a decision should be made about controlling transmissions from the content server over the first link, based on the information about the context of the end device. The method further includes controlling transmissions from the content server over the first link, based on information relating to a Quality of Experience at the end device.

20 Claims, 11 Drawing Sheets

(51) Int. Cl.

| | |
|---|---|
| *H04L 65/612* | (2022.01) |
| *H04L 65/613* | (2022.01) |
| *H04L 65/80* | (2022.01) |

(58) Field of Classification Search

CPC ........... H04N 21/6377; H04N 21/6379; H04N 21/6371; H04N 21/43637; H04N 21/64707; H04N 21/4104; H04N 21/44227; H04N 21/64769; H04L 65/1045; H04L 65/80; H04L 65/613; H04L 1/0002; H04L 67/289; H04L 65/1083; H04L 65/612; H04L 65/1059; H04L 65/764; H04L 65/762; H04L 75/765; H04W 4/80

See application file for complete search history.

(56) References Cited

U.S. PATENT DOCUMENTS

| | | | | |
|---|---|---|---|---|
| 2006/0013235 | A1* | 1/2006 | Farnham ............... | H04L 67/565 370/401 |
| 2006/0025181 | A1* | 2/2006 | Kalofonos ........ | H04W 52/0212 455/574 |
| 2007/0078959 | A1* | 4/2007 | Ye ......................... | H04L 67/568 709/223 |
| 2008/0192710 | A1* | 8/2008 | Balachandran ....... | H04L 47/263 370/338 |
| 2009/0083431 | A1* | 3/2009 | Balachandran ....... | H04L 65/762 709/228 |
| 2013/0275615 | A1* | 10/2013 | Oyman ............... | H04L 63/0884 709/231 |
| 2015/0215359 | A1 | 7/2015 | Bao et al. | |
| 2016/0142510 | A1 | 5/2016 | Westphal et al. | |
| 2018/0049125 | A1* | 2/2018 | Damola ................ | H04W 28/22 |
| 2018/0309688 | A1* | 10/2018 | Sarker ..................... | H04L 65/60 |
| 2020/0404088 | A1* | 12/2020 | Alcorn ............. | H04M 1/72412 |

OTHER PUBLICATIONS

M. Ramachandra, "Controlled streaming of video over the Internet," 2016 International Conference on Computer Communication and Informatics (ICCCI), Coimbatore, India, 2016, pp. 1-4, (Year: 2016).*

International Search Report and Written Opinion of the International Searching Authority, PCT/EP2020/064983, mailed Feb. 18, 2021, 11 pages.

Bluetooth Core Specification, Revision V5.2, Dec. 31, 2019, Bluetooth SIG Proprietary, Core Specification Working Group, 3256 pages.

Bluetooth Core Specification, Revision V5.1, Jan. 21, 2019, Bluetooth SIG Proprietary, Core Specification Working Group, 2985 pages.

* cited by examiner

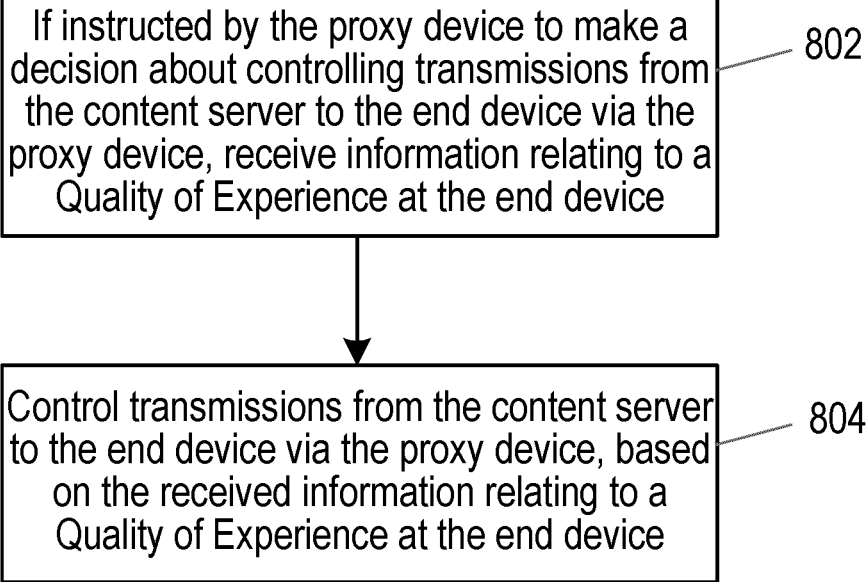

If instructed by the proxy device to make a decision about controlling transmissions from the content server to the end device via the proxy device, receive information relating to a Quality of Experience at the end device    802

Control transmissions from the content server to the end device via the proxy device, based on the received information relating to a Quality of Experience at the end device    804

Fig. 8

CONTROLLING COMMUNICATIONS FROM CONTENT SERVER TO END DEVICE

CROSS REFERENCE TO RELATED APPLICATIONS

This application is a 35 U.S.C. § 371 national stage application of PCT International Application No. PCT/EP2020/064983 filed on May 29, 2020, the disclosure and content of which is incorporated by reference herein in its entirety.

TECHNICAL FIELD

Embodiments of the present disclosure relate to a method of controlling communications from a content server to an end device via a proxy device, wherein the content server has a connection to the proxy device over a first link using a streaming control protocol, and the proxy device also has a connection to the end device over a second link, and to entities for performing steps in the method.

BACKGROUND

It is common for data to be streamed from a server to a client device such as a tablet or laptop computer, or a smartphone, for example in video or music streaming applications. The transport protocols that are used for establishing and controlling media sessions between end points, such as the Real Time Streaming Protocol (RTSP) and Quick UDP Internet Connection (QUIC), are able to adapt the transmissions in response to the variations in the link quality. The link quality may for example be measured by metrics such as throughput, delay, jitter, and dropped frames. In the cases where the link quality degrades, for example there is a reduction in throughput, the retransmission of the packets takes place without packet loss.

It is often preferred to proxy the stream from the client device (that is, the tablet or laptop computer, or a smartphone, for example), which acts as an end terminal for the transport protocol, further to another device. For example, the user may wish to transfer the data to an end device such as a wireless headset or a TV monitor, using a short-range wireless access technology such as WiFi or Bluetooth. It is known that the Bluetooth protocol can allow for the transmission of Quality of Service parameters between the two devices that are connected by the Bluetooth link. However, in cases as described above, where the client device acts as a proxy device, and the stream between the proxy device and the end device is based on the User Datagram Protocol (UDP), the original streaming from the server does not adapt to any variations in the link between the end device and the proxy device. Thus, the stream may continue between the server and the proxy device, while in reality the final presentation quality at the end device is poor, with packet drops and skipped video or audio content.

SUMMARY

According to a first aspect, there is provided a method for controlling communications from a content server to an end device via a proxy device. The content server has a connection to the proxy device over a first link using a streaming control protocol, and the proxy device also has a connection to an end device over a second link. The method comprises, at the end device, transmitting information to the proxy device about a context of the end device. The method further comprises, if instructed by the proxy device to make a decision about controlling transmissions from the content server over the first link, making said decision based on information relating to a Quality of Experience at the end device; or, if not instructed by the proxy device to make the decision about controlling transmissions from the content server over the first link, transmitting said information relating to the Quality of Experience at the end device to the proxy device.

According to a second aspect, there is provided a method for controlling communications from a content server to an end device via a proxy device. The content server has a connection to the proxy device over a first link using a streaming control protocol, and the proxy device also has a connection to an end device over a second link. The method comprises, in the proxy device, receiving from the end device information about a context of the end device. The method further comprises determining where a decision should be made about controlling transmissions from the content server over the first link. The method further comprises, in response to determining that the decision about controlling transmissions from the content server over the first link should be made in the proxy device, receiving information from the end device relating to a Quality of Experience at the end device, and making said decision based on said received information; or, in response to determining that the decision about controlling transmissions from the content server over the first link should be made in the end device or in the content server, notifying the end device or the content server respectively of the determination.

According to a third aspect, there is provided a method for controlling communications from a content server to an end device via a proxy device. The content server has a connection to the proxy device over a first link using a streaming control protocol, and the proxy device also has a connection to an end device over a second link. The method comprises, at the content server, if instructed by the proxy device to make a decision about controlling transmissions from the content server over the first link, receiving information relating to a Quality of Experience at the end device. The method then further comprises controlling transmissions from the content server over the first link, based on the received information relating to a Quality of Experience at the end device.

According to a fourth aspect, there is provided a method for controlling communications from a content server to a proxy device over a first link using a streaming control protocol. The proxy device also has a connection to an end device over a second link. The method comprises obtaining information about a context of the end device. The method further comprises determining where a decision should be made about controlling transmissions from the content server over the first link, based on the information about the context of the end device. The method further comprises controlling transmissions from the content server over the first link, based on information relating to a Quality of Experience at the end device.

The information relating to the Quality of Experience at the end device may comprise information about the context of the end device.

The information relating to the Quality of Experience at the end device may comprise information relating to time gaps between packets received at the end device.

The information relating to the Quality of Experience at the end device may comprise information relating to a state of a buffer containing packets received at the end device.

Obtaining information about the context of the end device may comprise receiving information about a property of the end device.

Obtaining information about the context of the end device may comprise receiving information about a user's usage of the end device.

The second link may be a short-range wireless link, and more specifically may be a Bluetooth link.

Controlling transmissions from the content server over the first link may comprise pausing transmissions from the content server.

Controlling transmissions from the content server over the first link may comprise adapting a data rate of transmissions from the content server.

Controlling transmissions from the content server over the first link may comprise buffering transmitted data at the proxy device.

This has the advantage that end-to-end communications from the content server to the end device via the proxy device can be controlled, even though the data transport between the content server and the proxy device is over a first link and the data transport between the proxy device and the end device is over a second link using a different communications protocol.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 8 is a flow chart, illustrating a fourth method performed in the content server of FIG. 1;

DETAILED DESCRIPTION

Figure 1:
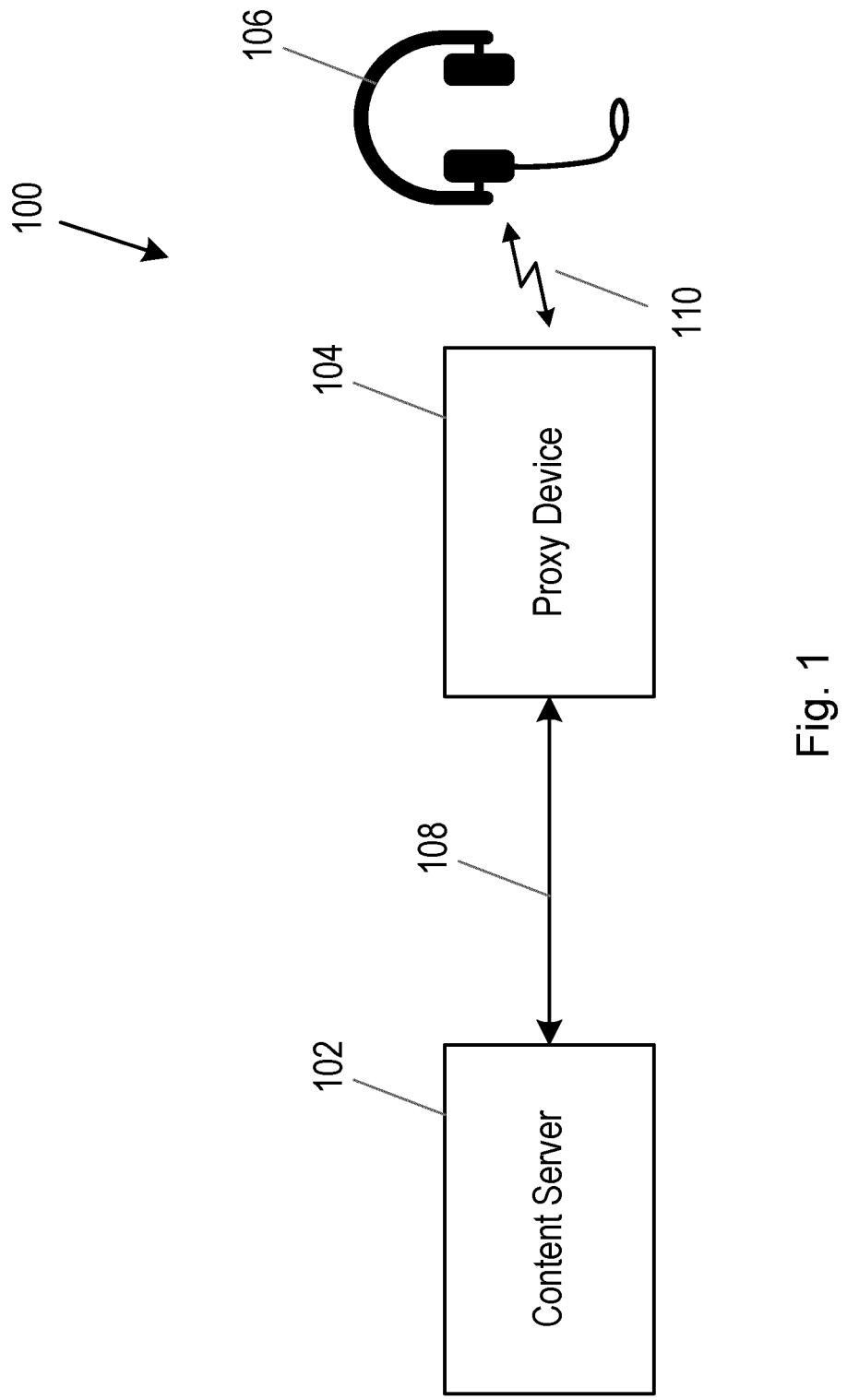
FIG. 1 illustrates a communications system, in one example.

FIG. 1 illustrates a communications system 100, according to one embodiment.

In the example shown in FIG. 1, there is a content server 102, a proxy device 104, and an end device 106.

The content server 102 may also be referred to as a streaming server, and forms part of a content delivery network (CDN).

The proxy device 104 may be any suitable electronic device, such as a personal, computer, laptop computer or tablet computer, a smartphone, games controller, or the like.

The end device 106 may be any suitable device, for example an accessory such as the headset shown in FIG. 1 or a TV monitor, to which content may be sent.

The first link 108 between the content server 102 and the proxy device 104 may for example a link over the internet, i.e. using Internet Protocol (IP), and may include wireless and wired sections. For example, when the proxy device 104 is a smartphone, it may have a cellular wireless connection to a radio access node of the cellular network, and the radio access node may then have a wired connection to the content server 102 and other devices accessible over the internet.

The second link 110 between the proxy device 104 and the end device 106 may for example use a short-range wireless communications protocol, such as Bluetooth.

Figures 2, 3:
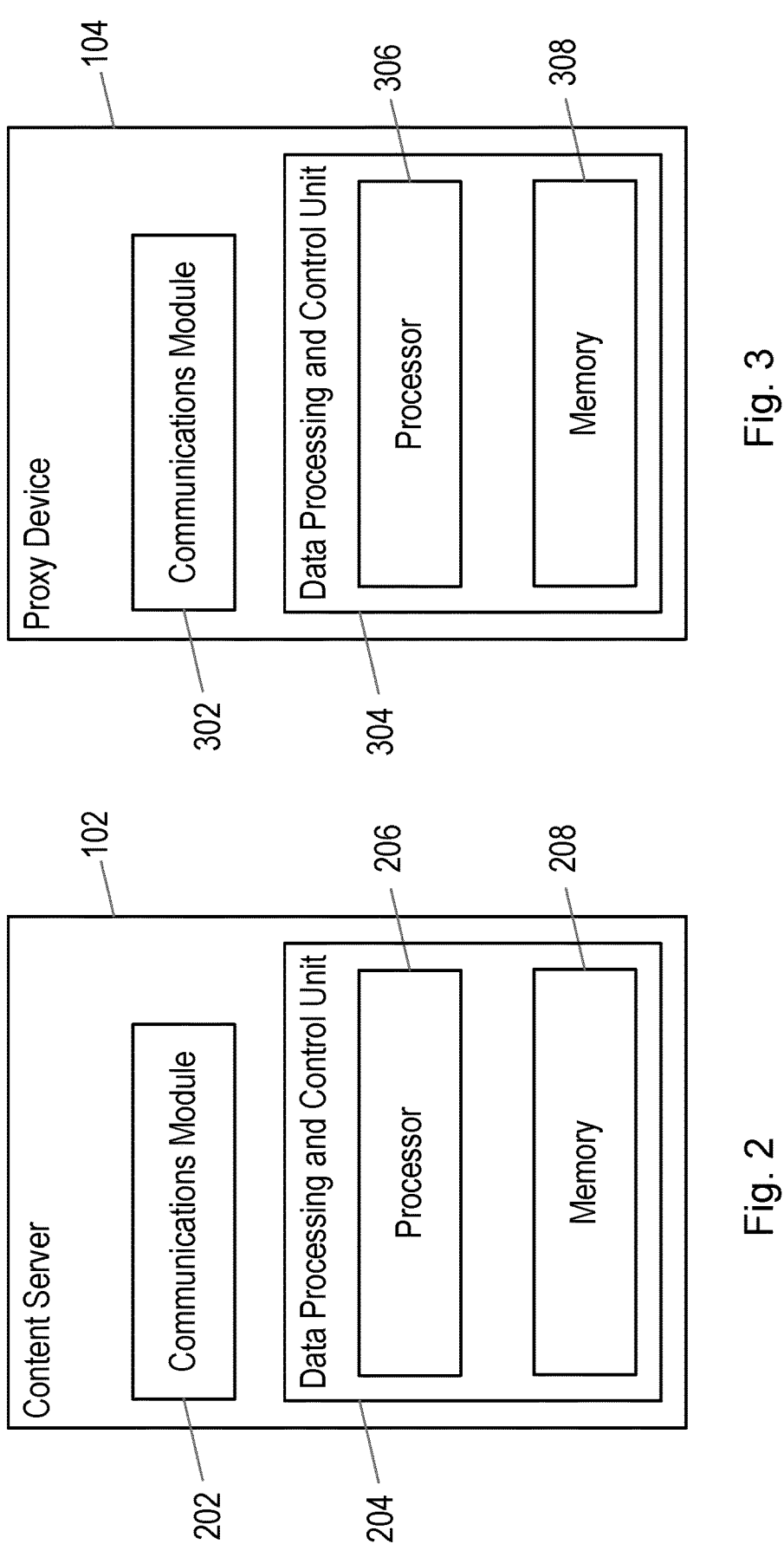
FIG. 2 illustrates a form of a content server in the system of FIG. 1.
FIG. 3 illustrates a form of a proxy device in the system of FIG. 1.

FIG. 2 shows in more detail the form of the content server 102. It will be appreciated that the content server 102 may have other features that are not shown in FIG. 2 but the illustrated features are sufficient for an understanding of the present invention.

The content server 102 has a communications module 202, suitable for communicating with other devices, for example for communicating with the proxy device 104 over the internet.

The content server 102 also has a data processing and control unit 204, which includes one or more processor 206 and one or more memory 208. The memory 208 is suitable for storing data and program instructions, and the processor 206 is suitable for performing the methods described herein on the basis of the stored program instructions.

FIG. 3 shows in more detail the form of the proxy device 104. It will be appreciated that the proxy device 104 may have other features that are not shown in FIG. 3 but the illustrated features are sufficient for an understanding of the present invention.

The proxy device 104 has a communications module 302, suitable for communicating with other devices, for example for communicating with the content server 102 over the internet, and for communicating with the end device 106 over a short-range wireless communications protocol.

The proxy device 104 also has a data processing and control unit 304, which includes one or more processor 306 and one or more memory 308. The memory 308 is suitable for storing data and program instructions, and the processor 306 is suitable for performing the methods described herein on the basis of the stored program instructions.

Figure 4:
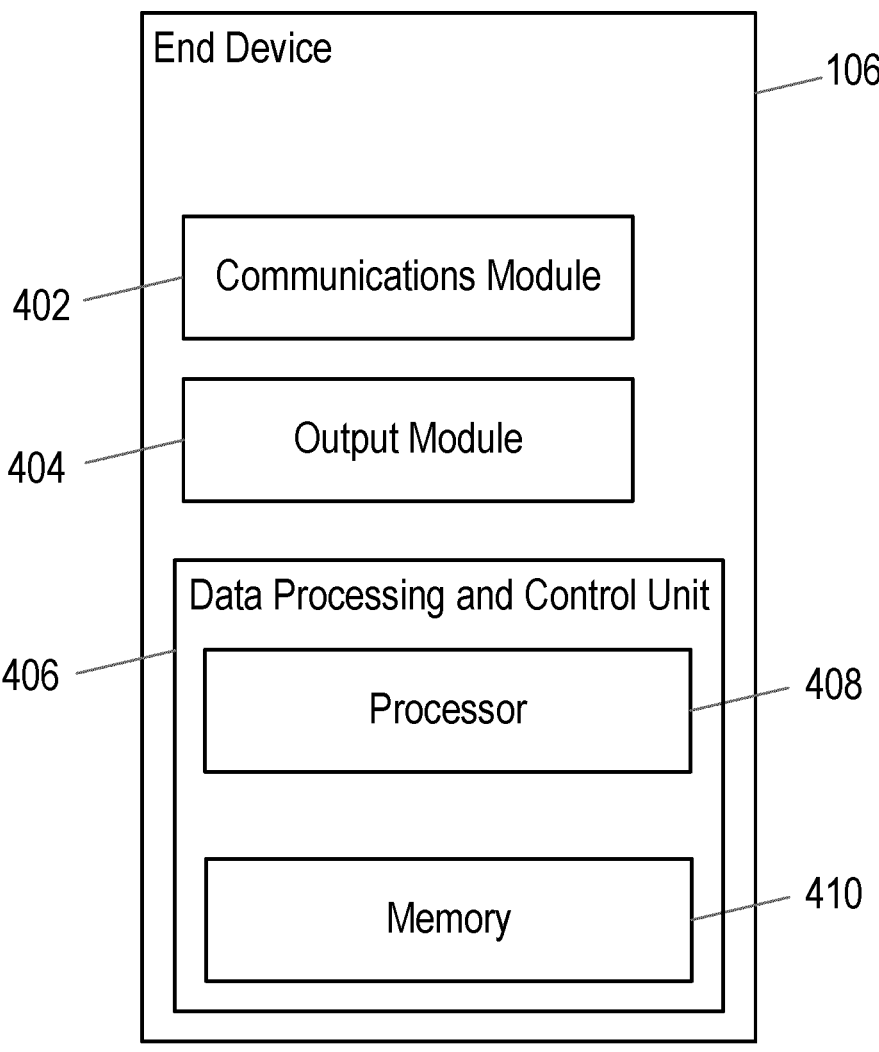
FIG. 4 illustrates a form of an end device in the system of FIG. 1.

FIG. 4 shows in more detail the form of the end device 106. It will be appreciated that the end device 106 may have other features that are not shown in FIG. 4 but the illustrated features are sufficient for an understanding of the present invention.

The end device 106 has a communications module 402, suitable for communicating with other devices, for example for communicating with the proxy device 104 over the shot-range wireless link.

The end device 106 also has an output module 404, for providing an output that can be used by the user. For example, the output module 404 may comprise loudspeakers for generating an audio output and/or a display for generating a visual output.

The end device 106 also has a data processing and control unit 406, which includes one or more processor 408 and one or more memory 410. The memory 410 is suitable for storing data and program instructions, and the processor 408 is suitable for performing the methods described herein on the basis of the stored program instructions.

Figure 5:
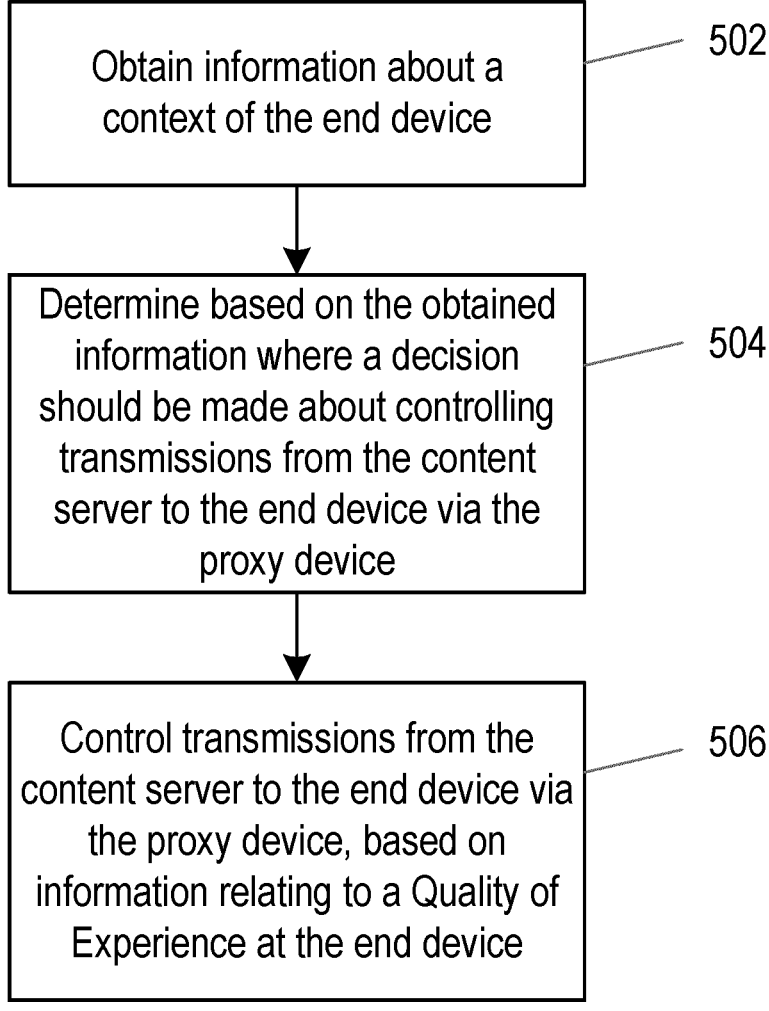
FIG. 5 is a flow chart, illustrating a method performed in the system of FIG. 1.

FIG. 5 is a flow chart, illustrating a method performed in the system 100.

Specifically, FIG. 5 illustrates a method for controlling communications from a content server to an end device via a proxy device, wherein the content server has a connection to the proxy device over a first link using a streaming control protocol, and the proxy device also has a connection to an end device over a second link.

The method comprises step 502 of obtaining information about a context of the end device.

The method then comprises step 504 of using the obtained information about the context of the end device to determine where a decision should be made about controlling transmissions from the content server to the end device via the proxy device.

In step 506, transmissions from the content server to the end device via the proxy device are controlled, based on information relating to a Quality of Experience at the end device.

Figure 6:
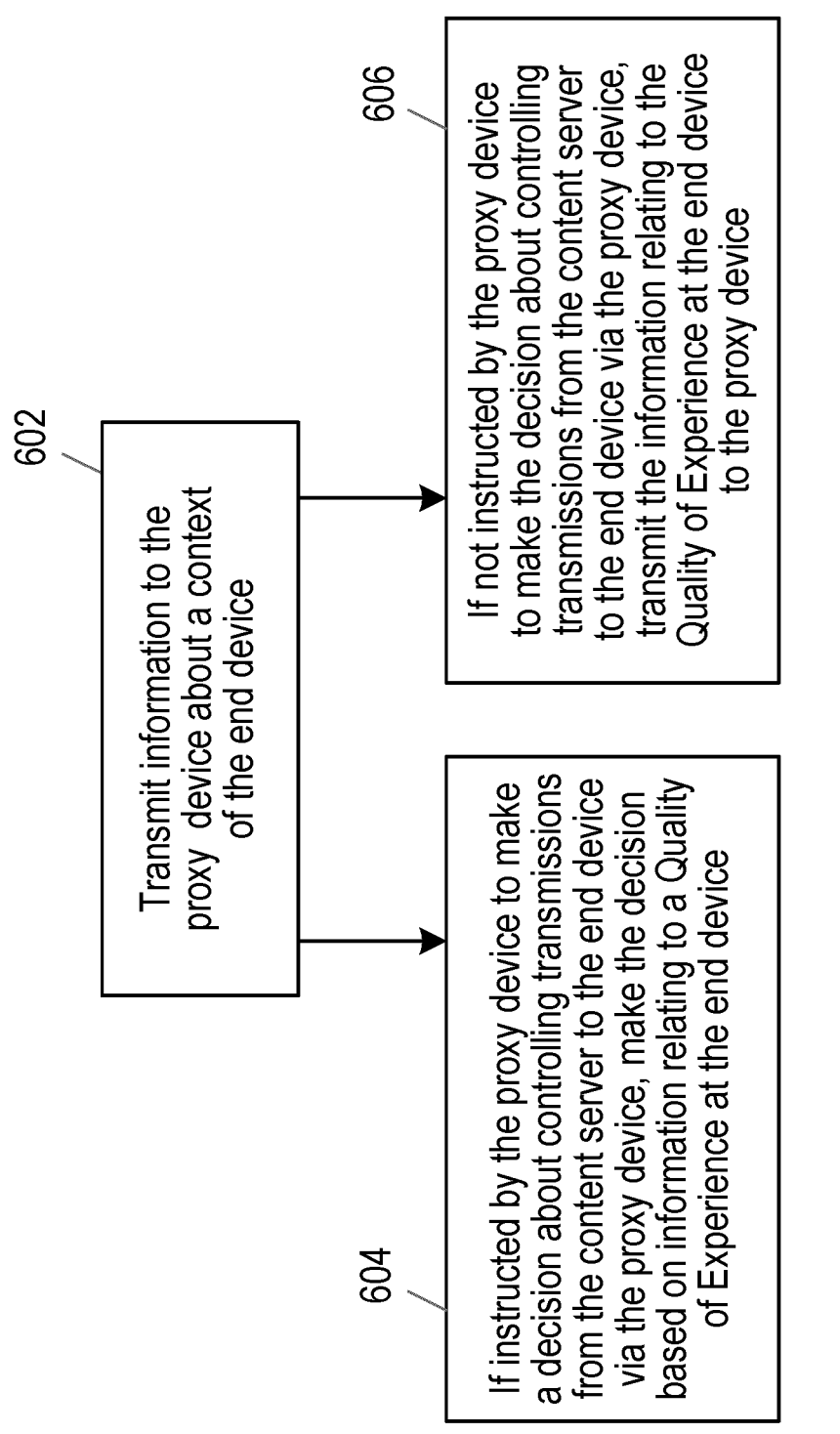
FIG. 6 is a flow chart, illustrating a method performed in the end device of FIG. 1.

FIG. 6 is a flow chart, illustrating a method performed in the end device 106.

Specifically, FIG. 6 illustrates a method for controlling communications from the content server to the end device via the proxy device, wherein the content server has a connection to the proxy device over a first link using a streaming control protocol, and the proxy device also has a connection to an end device over a second link.

The method comprises step 602 of transmitting information from the end device to the proxy device about a context of the end device.

Then, at step 604, if the end device is instructed by the proxy device to make a decision about controlling transmissions from the content server to the end device via the proxy device, it makes the decision based on information relating to a Quality of Experience at the end device.

Alternatively, at step 606, if the end device is not instructed by the proxy device to make the decision about controlling transmissions from the content server to the end device via the proxy device, it transmits the information relating to the Quality of Experience at the end device to the proxy device.

Figure 7:
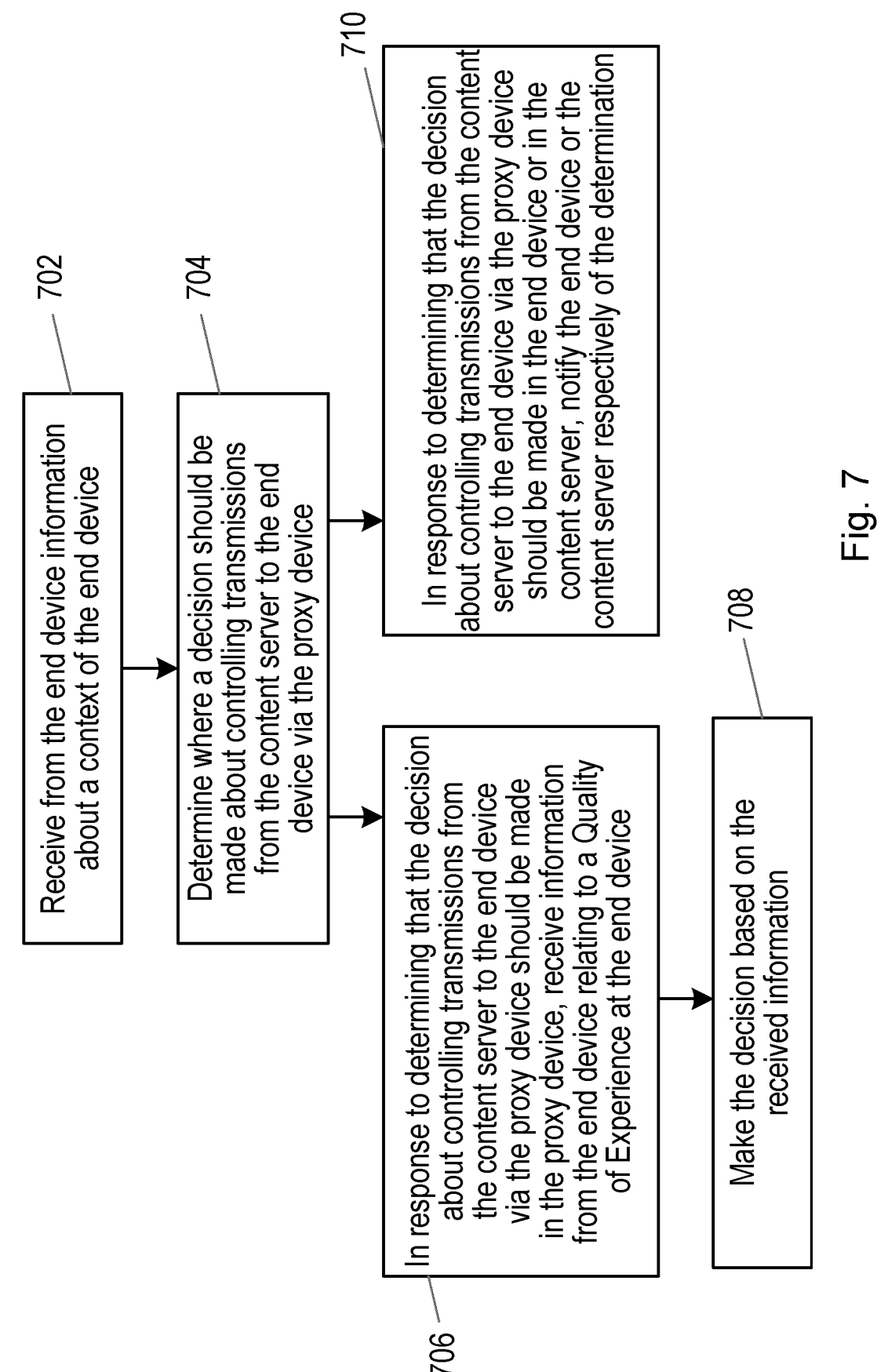
FIG. 7 is a flow chart, illustrating a third method performed in the proxy device of FIG. 1.

FIG. 7 is a flow chart, illustrating a method performed in the proxy device 104.

Specifically, FIG. 7 illustrates a method for controlling communications from the content server to the end device via the proxy device, wherein the content server has a connection to the proxy device over a first link using a streaming control protocol, and the proxy device also has a connection to an end device over a second link.

The method comprises step 702 of receiving, in said proxy device, from the end device, information about a context of the end device.

Then, at step 704, the proxy device determines where a decision should be made about controlling transmissions from the content server to the end device via the proxy device.

If the proxy device determines that the decision about controlling transmissions from the content server to the end device via the proxy device should be made in the proxy device, at step 706 it receives information from the end device relating to a Quality of Experience at the end device, and at step 708 it makes the decision based on the received information.

Alternatively, if the proxy device determines that the decision about controlling transmissions from the content server to the end device via the proxy device should be made in the end device or in the content server, at step 710 it notifies the end device or the content server respectively of the determination.

FIG. 8 is a flow chart, illustrating a method performed in the content server 102.

Specifically, FIG. 8 illustrates a method for controlling communications from the content server to the end device via the proxy device, wherein the content server has a connection to the proxy device over a first link using a streaming control protocol, and the proxy device also has a connection to an end device over a second link.

The method comprises step 802 of, if instructed by the proxy device to make a decision about controlling transmissions from the content server to the end device via the proxy device, receiving information relating to a Quality of Experience at the end device.

At step 804, the content server controls transmissions from the content server to the end device via the proxy device, based on the received information relating to a Quality of Experience at the end device.

Figure 9:
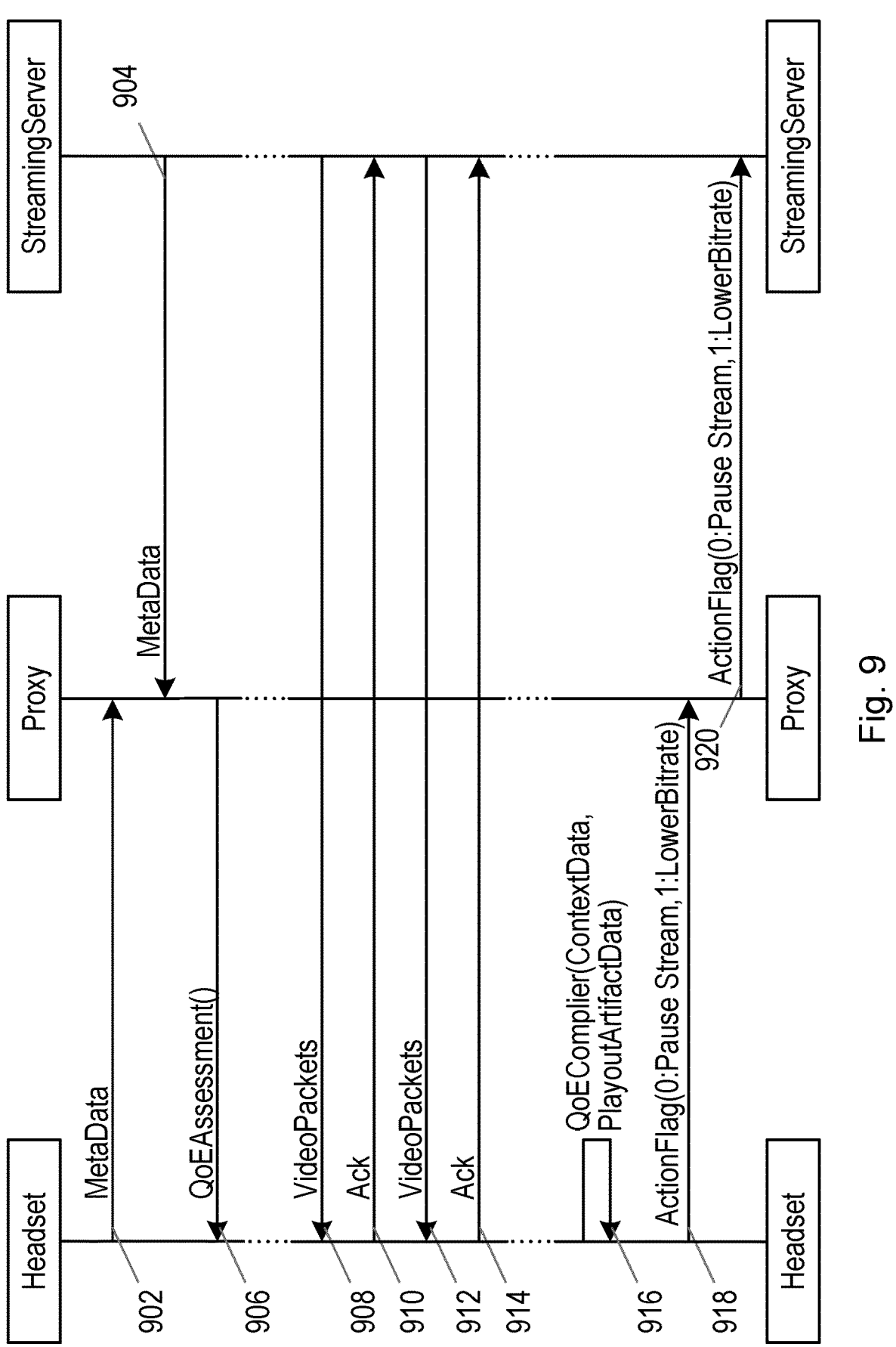
FIG. 9 is a signalling diagram, showing one example of a method.

FIG. 9 is a signalling diagram, illustrating one example embodiment.

At step 902, the end device (which, in this example, takes the form of a headset device) sends metadata to the proxy device. The metadata relates to the context of the end device.

For example, the data sent by the end device to the proxy device in step 902 may relate to the properties of the end device. More specifically, the data sent by the end device to the proxy device in step 902 may relate to the processing capabilities of the end device. The data may relate to the general processing capabilities and/or the available memory of the device and/or may relate to the battery life of the device if this may impact on the current ability of the device to run the relevant algorithms.

At step 904, the streaming server sends metadata to the proxy device.

For example, the metadata sent by the streaming server to the proxy device in step 904 may relate to the processing capabilities of the streaming server. More specifically, the metadata sent by the streaming server to the proxy device in step 904 may relate to the processing load on the streaming server, and hence its available processing capabilities at the present time. In addition, the streaming server may inform the proxy device if the proxy device is able to access an aggregated golden model, which may for example be a federated model trained on multiple similar streaming sessions involving other similar end devices.

Steps 902 and 904 may for example be performed at the start of every streaming session, with the decisions on controlling the transmissions being made in the same entity for the whole of that transmission. Manifest files are shared between the streaming server and the client (proxy device) at the beginning of every session, where the manifest contains metadata about all available bitrates that the content is encoded with, etc. The information from the server regarding server capabilities can be appended to this manifest file. Similarly, when necessary, the metadata information from the proxy device and the end device can be sent as a reply to the streaming server in this first handshake.

Based on the metadata received in steps 902 and 904, and also based on information relating to the available bandwidth for sending data from the end device and/or the proxy device to the streaming server, the proxy device determines where decisions about controlling transmissions from the content server over the first link should be made.

In the example shown in FIG. 9, the proxy device determines that the decisions about controlling transmissions from the content server over the first link should be made in the end device. If there are available sufficient resources at the end device, making the decisions at the end device has the advantage of reducing the network footprint, since this minimises the amount of data that needs to be shared between entities.

Thus, at step 906, the proxy device sends a message to the end device. The message requests the end device to make an assessment as to whether transmissions from the content server over the first link should be controlled. More specifically, the message requests the end device to make the assessment based on the Quality of Experience of the user of the end device.

Then, the streaming server sends data to the end device via the proxy device. Thus, video packets are sent to the end device in step 908 and acknowledged in step 910, and further video packets are sent to the end device in step 912 and acknowledged in step 914.

While the data is being transmitted, at step 916 the end device performs the assessment of whether the transmissions need to be adapted.

Since end devices, such as headsets, have limited energy sources (for example, they are typically battery powered), and also have limited storage capabilities, they may perform relatively simple algorithms, that is, algorithms that are not computationally demanding.

For example, the method of determining the Quality of Experience may be based on information relating to the arrival of data at the end device. Thus, for example, the method may be based on observed input metrics that can be measured at the input interface of the end device. More specifically, the input metrics may be some or all of: the time gaps between the arrival of audio or video packets at the input interface of the end device; the delay jitter between audio packets being rendered at a loudspeaker in the headset; the state (for example, the percentage occupancy) of a playback buffer at the headset; and the packet receive/ transmit throughput measured at the headset or other end device.

The algorithms that are used for deciding whether the transmissions need to be adapted can be relatively simple threshold-based if-else algorithms (i.e. determining whether a value based on the input metric(s) exceeds a threshold), or can use shallow decision trees (leveraging lookup tables).

The value based on the input metric(s) may for example be an exponentially weighted moving average (EWMA) of values of the input metric(s), while the thresholds can be defined based on the mean and standard deviation of the historical datasets, (for example being defined as a certain number of standard deviations above the mean). The mean and standard deviation can be calculating based on the historical data measured at the device, using ring buffer methods with recursive approaches, so that the amount of data that needs to be stored is relatively small.

If it is decided in step 916 that the transmissions from the streaming server should be modified, at step 918 a flag is set in a message from the end device to the proxy device. For example, the flag may be set to 0 if the end device intends for the streaming server to pause the stream, or the flag may be set to 1 if the end device intends for the streaming server to reduce the bitrate of the transmission. In other embodiments, more control actions may be available, in which case multiple bits may be sent from the end device to the proxy device.

At step 920, the proxy device forwards the flag to the streaming server, which either stops the streaming or reduces the bitrate, as indicated. In the existing streaming control protocol, there already exists a control mechanism between the proxy and the streaming server, allowing the proxy device to request that the streaming server should reduce or increase the bitrate, or pause or resume transmissions, or re-transmit certain data. The message sent in step 1024 piggybacks on that existing control protocol between the streaming server and the proxy device.

Figure 10:
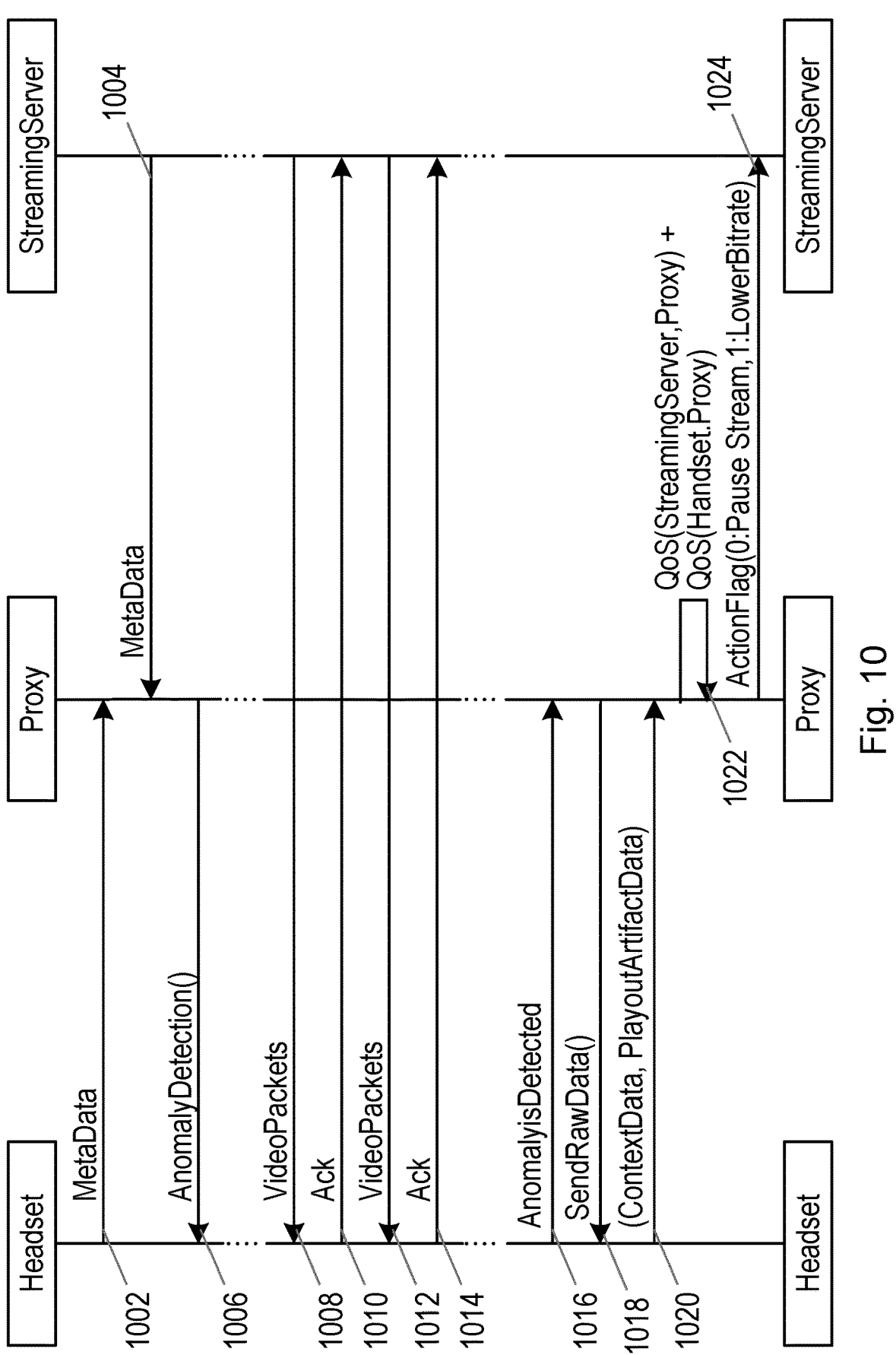
FIG. 10 is a signalling diagram, showing a second example of a method.

FIG. 10 is a signalling diagram, illustrating a second example embodiment.

At step 1002, the end device (which, in this example, takes the form of a headset device) sends metadata to the proxy device. The metadata relates to the context of the end device.

For example, the data sent by the end device to the proxy device in step 1002 may relate to the properties of the end device. More specifically, the data sent by the end device to the proxy device in step 1002 may relate to the processing capabilities of the end device. The data may relate to the general processing capabilities and/or the available memory of the device and/or may relate to the battery life of the device if this may impact on the current ability of the device to run the relevant algorithms.

At step 1004, the streaming server sends metadata to the proxy device.

For example, the metadata sent by the streaming server to the proxy device in step 1004 may relate to the processing capabilities of the streaming server. More specifically, the metadata sent by the streaming server to the proxy device in step 1004 may relate to the processing load on the streaming server, and hence its available processing capabilities at the present time. In addition, the streaming server may inform the proxy device if the proxy device is able to access an aggregated golden model, which may for example be a federated model trained on multiple similar streaming sessions involving other similar end devices.

Steps 1002 and 1004 may for example be performed at the start of every streaming session, with the decisions on controlling the transmissions being made in the same entity for the whole of that transmission. Manifest files are shared between the streaming server and the client (proxy device) at the beginning of every session, where the manifest contains metadata about all available bitrates that the content is encoded with, etc. The information from the server regarding server capabilities can be appended to this manifest file. Similarly, when necessary, the metadata information from the proxy device and the end device can be sent as a reply to the streaming server in this first handshake.

Based on the metadata received in steps 1002 and 1004, and also based on information relating to the available bandwidth for sending data from the end device and/or the proxy device to the streaming server, the proxy device determines where decisions about controlling transmissions from the content server over the first link should be made.

In the example shown in FIG. 10, the proxy device determines that the decisions about controlling transmissions from the content server over the first link should be made in the proxy device itself.

Thus, at step 1006, the proxy device sends a message to the end device. The message requests the end device to report any anomalies, which may be relevant to a decision as to whether transmissions from the content server over the first link should be controlled.

Then, the streaming server sends data to the end device via the proxy device. Thus, video packets are sent to the end device in step 1008 and acknowledged in step 1010, and further video packets are sent to the end device in step 1012 and acknowledged in step 1014.

While the data is being transmitted, the end device determines whether there is an anomaly that may be useful in an assessment of whether the transmissions need to be adapted. The end device may determine that there is such an anomaly by comparing certain parameter values with corresponding thresholds, and/or by running a machine learning model with certain data values as inputs. The method of determining whether there is such an anomaly may correspond to the actions taken in step 916 described above.

FIG. 10 illustrates a situation where the end device determines that there is such an anomaly, and sends a report to the proxy device at step 1016.

The proxy device responds at step 1018, by requesting the end device to provide information relevant to the Quality of Experience for the user of the end device.

The end device sends the relevant information to the proxy device at step 1020.

For example, this information may relate to the context of the end device, and may also relate to the playout of received data at the end device.

For example, information relating to the context of the end device may relate to the battery level of the end device, which can be observed via an available Application Programming Interface (API) from the operating system that is running. If the end device has very low power, it may be advantageous to reduce the bitrate in the data stream, since a higher bandwidth requires higher energy consumption.

As another example, information relating to the context of the end device may relate to a status of the device. For example, the data may indicate if the end device is in a low-power mode, or may indicate whether the user is paying attention or is busy with another task, or may indicate whether an end device in the form of a headset is being worn, for example.

As another example, information relating to the context of the end device may use existing tools and algorithms that are trained to observe and to classify the context of a user of the end device, for example whether the user is sitting, standing, or running.

For example, as described with reference to FIG. 9, information relating to the playout of received data at the end device may relate to metrics such as: the time gaps between the arrival of audio or video packets at the input interface of the end device; the delay jitter between audio packets being rendered at a loudspeaker in the headset; the state (for example, the percentage occupancy) of a playback buffer at the headset; and the packet receive/transmit throughput measured at the headset or other end device.

The proxy device may also make measurements, for example relating to the link quality (e.g. the signal strength) between the end device and the proxy device and/or the link quality between the proxy device and the streaming server.

At step 1022, the proxy device decides whether transmissions from the streaming server should be modified.

In some embodiments, this decision may be made using a machine learning model, which may for example be trained using data from many other end devices.

A suitable machine learning method may for example be a supervised learning method, for example using a neural network or ensemble bagging/boosting methods such as Random Forest or XGBoost.

The playout buffer state at the end device (for example the percentage occupancy of the playout buffer indicating a rebuffering event that might cause stalling) may be the target variable for the supervised learning model.

Thus, the proxy device is able to make its decision using its machine learning model, based on the information received from the end device that is relevant to the Quality of Experience for the user of the end device. This information is sent only when an anomaly has been detected, avoiding the need for the information relevant to the Quality of Experience to be sent continuously to the proxy device.

If it is decided in step 1022 that the transmissions from the streaming server should be modified, at step 1024 a flag is set in a message from the proxy device to the streaming server. For example, the flag may be set to 0 if the proxy device intends for the streaming server to pause the stream, or the flag may be set to 1 if the proxy device intends for the streaming server to reduce the bitrate of the transmission.

In the existing streaming control protocol, there already exists a control mechanism between the proxy and the streaming server, allowing the proxy device to request that the streaming server should reduce or increase the bitrate, or pause or resume transmissions, or re-transmit certain data. The message sent in step 1024 piggybacks on that existing control protocol between the streaming server and the proxy device.

The streaming server then either stops the streaming or reduces the bitrate, as indicated.

Figure 11:
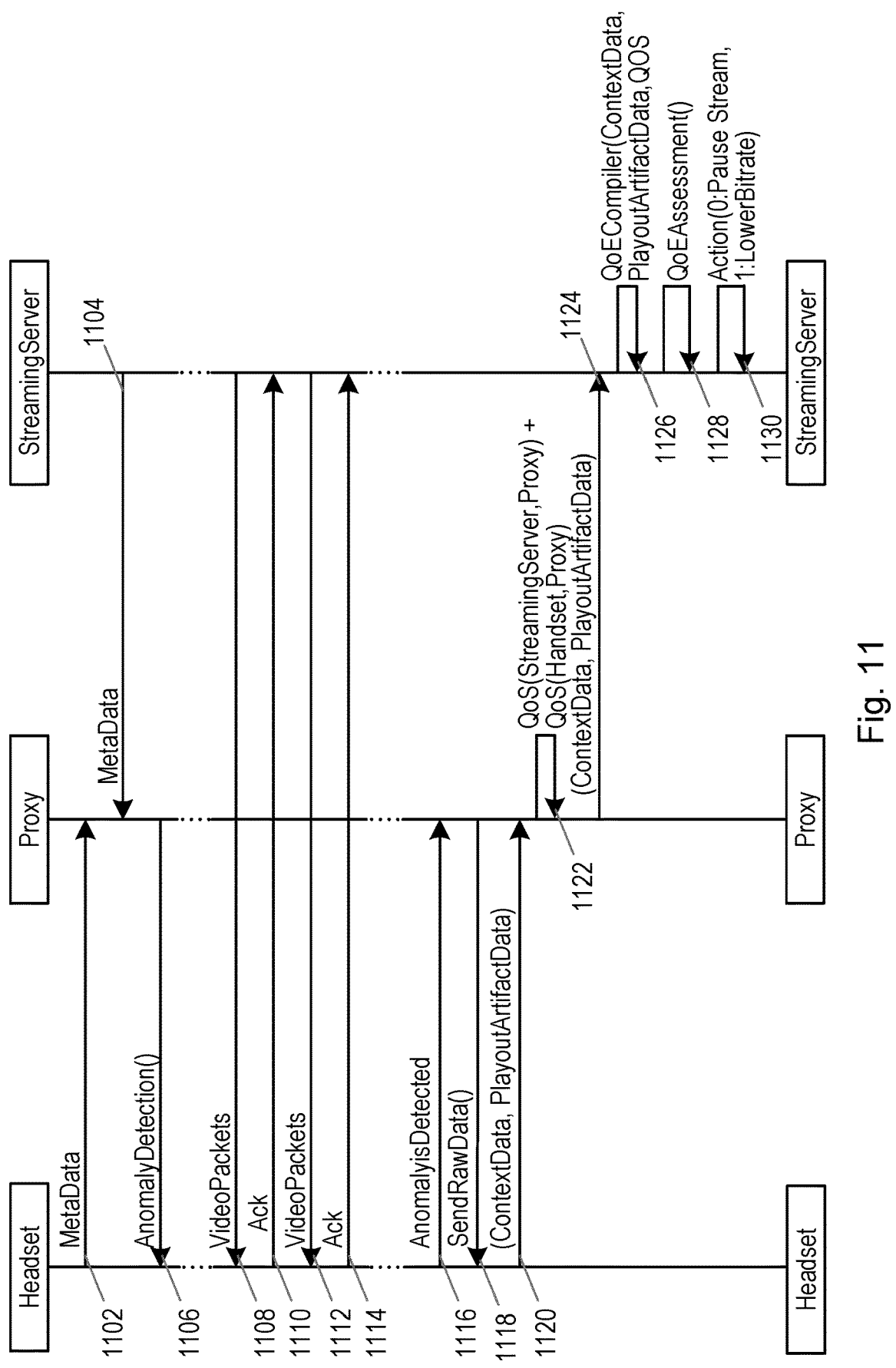
FIG. 11 is a signalling diagram, showing a third example of a method.

FIG. 11 is a signalling diagram, illustrating a third example embodiment.

At step 1102, the end device (which, in this example, takes the form of a headset device) sends metadata to the proxy device. The metadata relates to the context of the end device.

For example, the data sent by the end device to the proxy device in step 1102 may relate to the properties of the end device. More specifically, the data sent by the end device to the proxy device in step 1102 may relate to the processing capabilities of the end device. The data may relate to the general processing capabilities and/or the available memory of the device and/or may relate to the battery life of the device if this may impact on the current ability of the device to run the relevant algorithms.

At step 1104, the streaming server sends metadata to the proxy device.

For example, the metadata sent by the streaming server to the proxy device in step 1104 may relate to the processing capabilities of the streaming server. More specifically, the metadata sent by the streaming server to the proxy device in step 1104 may relate to the processing load on the streaming server, and hence its available processing capabilities at the present time. In addition, the streaming server may inform the proxy device if the proxy device is able to access an aggregated golden model, which may for example be a federated model trained on multiple similar streaming sessions involving other similar end devices.

Steps 1102 and 1104 may for example be performed at the start of every streaming session, with the decisions on controlling the transmissions being made in the same entity for the whole of that transmission. Manifest files are shared between the streaming server and the client (proxy device) at the beginning of every session, where the manifest contains metadata about all available bitrates that the content is encoded with, etc. The information from the server regarding server capabilities can be appended to this manifest file. Similarly, when necessary, the metadata information from the proxy device and the end device can be sent as a reply to the streaming server in this first handshake.

Based on the metadata received in steps 1102 and 1104, and also based on information relating to the available bandwidth for sending data from the end device and/or the proxy device to the streaming server, the proxy device determines where decisions about controlling transmissions from the content server over the first link should be made.

In the example shown in FIG. 11, the proxy device determines that the decisions about controlling transmissions from the content server over the first link should be made in the streaming server, or content server.

Making the decisions has the cost of requiring quantities of raw data, on which the decisions will be based, to be transferred from the end device to the proxy device, and then to the streaming server, but it does allow complex machine learning models to be used to make the decisions.

Thus, at step 1106, the proxy device sends a message to the end device. The message requests the end device to report any anomalies, which may be relevant to a decision as to whether transmissions from the content server over the first link should be controlled.

Then, the streaming server sends data to the end device via the proxy device. Thus, video packets are sent to the end device in step 1108 and acknowledged in step 1110, and further video packets are sent to the end device in step 1112 and acknowledged in step 1114.

While the data is being transmitted, the end device determines whether there is an anomaly that may be useful in an assessment of whether the transmissions need to be adapted. The end device may determine that there is such an anomaly by comparing certain parameter values with corresponding thresholds, and/or by running a machine learning model with certain data values as inputs. The method of determining whether there is such an anomaly may correspond to the actions taken in step 916 described above.

FIG. 11 illustrates a situation where the end device determines that there is such an anomaly, and sends a report to the proxy device at step 1116.

The proxy device responds at step 1118, by requesting the end device to provide information relevant to the Quality of Experience for the user of the end device.

The end device sends the relevant information to the proxy device at step 1120.

For example, this information may relate to the context of the end device, and may also relate to the playout of received data at the end device.

For example, information relating to the context of the end device may relate to the battery level of the end device, which can be observed via an available Application Programming Interface (API) from the operating system that is running. If the end device has very low power, it may be advantageous to reduce the bitrate in the data stream, since a higher bandwidth requires higher energy consumption.

As another example, information relating to the context of the end device may relate to a status of the device. For example, the data may indicate if the end device is in a low-power mode, or may indicate whether the user is paying attention or is busy with another task, or may indicate whether an end device in the form of a headset is being worn, for example.

As another example, information relating to the context of the end device may use existing tools and algorithms that are trained to observe and to classify the context of a user of the end device, for example whether the user is sitting, standing, or running.

For example, as described with reference to FIG. 9, information relating to the playout of received data at the end device may relate to metrics such as: the time gaps between the arrival of audio or video packets at the input interface of the end device; the delay jitter between audio packets being rendered at a loudspeaker in the headset; the state (for example, the percentage occupancy) of a playback buffer at the headset; and the packet receive/transmit throughput measured at the headset or other end device.

At step 1122, the proxy device makes measurements relating to the Quality of Service experienced by the end device, for example relating to the link quality (e.g. the signal strength) between the end device and the proxy device and/or the link quality between the proxy device and the streaming server.

At step 1124, the proxy device sends the information received from the end device in step 1120 and the results of the measurements that it made in step 1122 to the streaming server.

At step 1126, the streaming server compiles the received data into a form that is suitable for inputting into a machine learning model, and at step 1128 the machine learning model is run. Thus, in some embodiments, step 1126 involves structuring all received QoE and context data into a tabular form, for example representing all the attributes with the corresponding descriptive statistics such as avg. mean, max. std. min, quantiles, at a given time period in separate columns.

EXAMPLE

---

X = {"Avg_delay_between_proxy_headset", "min_delay_between_proxy_headset", "variation of Bluetooth signal strength",
....
"user_is_sitting",
headset_volume,
"user_no_attention",
"% of empty buffer at the end device", ...}

---

The machine learning model then gives a decision which is blended with other existing input from the streaming protocol between the proxy and the server.

The machine learning model can act as a prediction model, which predicts adverse events at the end device such as stalling events, so that actions can be executed proactively to avoid such events.

The streaming server may be a powerful device, in terms of the availability of CPUs, cores, memory (RAM), and storage. Since the CDN can stream video packets to multiple proxies and hence many different end devices (e.g., headsets), more advanced machine learning models (e.g., Deep Neural Networks) can be trained, because they have access to more data and/or models of more devices.

There can be many input metrics to the machine learning model, including the context-based attributes related to Quality of Experience factors, and also the Quality of Service parameters measured continuously between the proxy and the headset (e.g., Bluetooth signal strength, the delay jitter in between the audio packets being rendered at the speaker of the headset, the packet RX/TX throughput measured at the headset). The label for the supervised learning will be received from the headset device (obtained via the QoE compiler) via the proxies and will be used in training the supervised learning model. The playout buffer state at the headset (where the percentage occupancy of the playout buffer indicating a rebuffering event that might cause a stalling event) is the label.

At step 1130, the streaming server decides using the machine learning model whether its transmissions should be modified, and, if so, takes the appropriate action, such as pausing the stream or reducing the bitrate.

Figure 12:
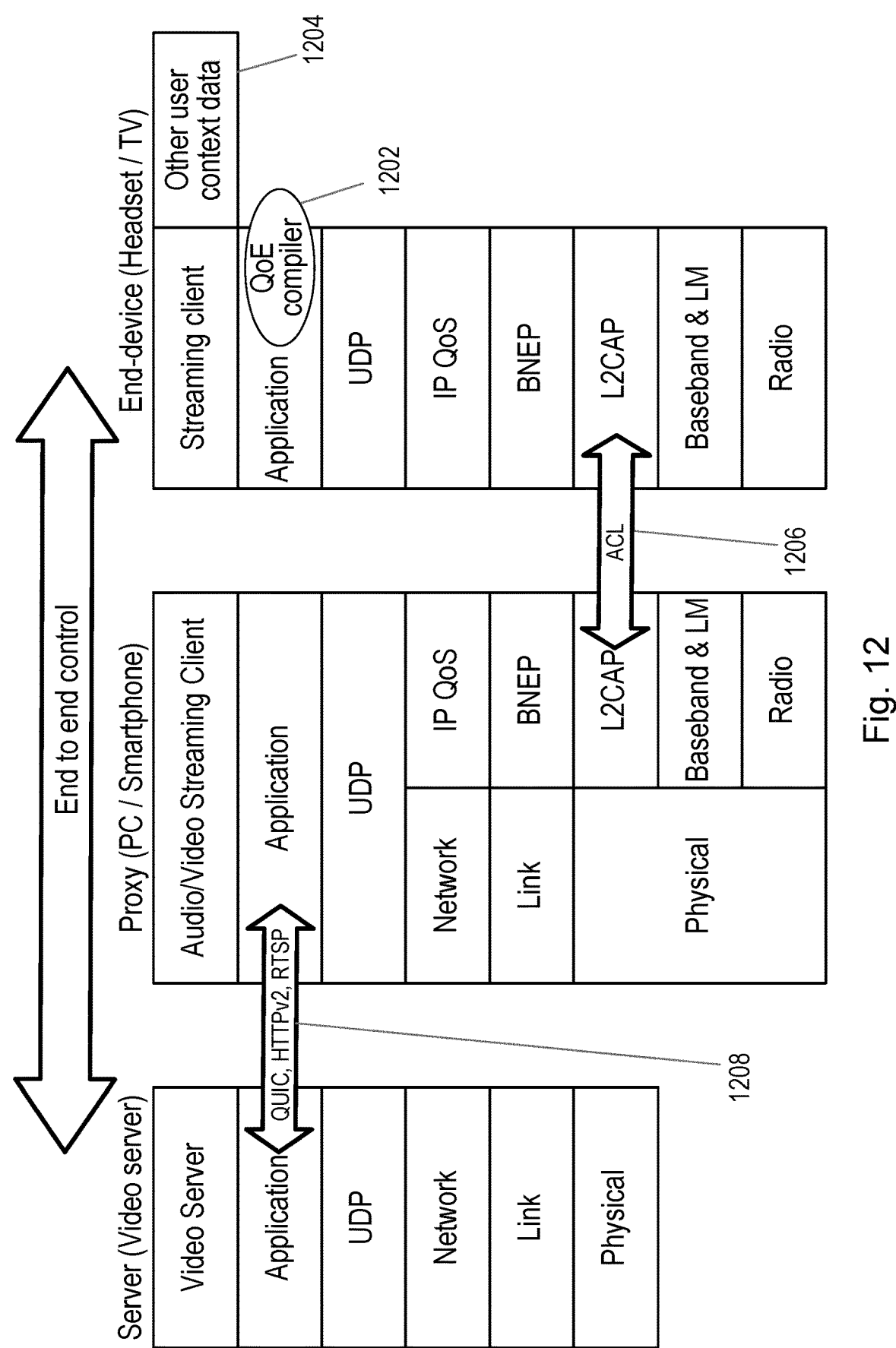
FIG. 12 is a protocol diagram, showing the signalling in the method of FIG. 11.

FIG. 12 is a protocol diagram, illustrating how information is transferred from the end device to the streaming server, in the methods of FIGS. 10 and 11.

Specifically, FIG. 12 shows the communications protocols used for communication between the streaming server (which, in this example, is a video server) and the proxy device (which may for example be a computer or a smartphone), which acts as a streaming client for the audio and/or video data. FIG. 12 also shows the communications protocols used for communication between the proxy device and the end device (which may for example be a headset or TV).

Thus, as described with reference to FIGS. 10 and 11, the end device may be required to send information to the proxy device, for use in deciding whether transmissions from the streaming server should be modified, for example at step 1020 in FIG. 10 and at step 1120 in FIG. 11.

As shown at 1202, the end device collects data relevant to the Quality of Experience at the user device. This includes data relating to the Bluetooth protocol Quality of Service (QoS), and other user context data 1204.

The Bluetooth protocol has a QoS option, in which relevant QoS parameters can be transmitted from the end device to the proxy device.

Specifically, as described in Chapter 3.6 PHYSICAL LINK SUPPORT FOR QOS of the Bluetooth Specifications, unused fields in the header can enable transmission of QoS parameters when the QoS option is enabled. QoS parameters that can be identified are bandwidth, latency, delay variation, token rate, and token bucket size.

| 0x03 | Length = 22 | Flags | Service type |
|------|-------------|-------|--------------|
| Token Rate | | | |
| Token Bucket Size (octets) | | | |
| Peak Bandwidth | | | |
| Latency | | | |
| Delay Variation | | | |

This existing mechanism can be adapted to further include the user context data 1204, for example in otherwise unused fields. For example, the Flags field identified above can be used for transmitting information measured at the end device.

Another option from the Bluetooth Specifications that can be enabled is the "retransmission and flow control option", where reliability issues (such as Forward Error Correction (FEC), Automatic Repeat Request (ARQ), and retransmission) are covered.

In general, all observations from the end device can be included in appropriate option fields available in the Bluetooth specifications, for transmission to the proxy device.

As shown at 1206, the data relevant to the Quality of Experience, including the QoS parameters and the user context data 1204 are included in Logical link control and adaptation protocol (L2CAP) packets transmitted over the Bluetooth Asynchronous Connection-Less (ACL) link from the end device to the proxy device.

Thus, the physical layer can be utilized to piggyback sensor metrics measured at the end device to the proxy device.

In addition, as shown at 1208, in the method of FIG. 11, the data relevant to the Quality of Experience sent from the end device to the proxy device, plus any additional data obtained from measurements at the proxy device, are piggybacked onto the existing transport protocol (e.g. QUIC, RTSP, or Hypertext Transport Protocol v2 (HTTPv2)) between the proxy device and the streaming server. For example, this information may be forwarded into the application layer (as shown at 1208 in FIG. 12) or the network layer at the proxy device, and added inside the IP or the RTSP header.

Thus, the streaming server becomes aware of the Quality of Experience at the end device, and is able to perform actions such as reducing the bitrate, pausing the transmission of the video and/or audio data, retransmitting packets, etc, based on the result of applying the machine learning algorithm to the received data.

Thus, this allows end-to-end control of the transmissions from the streaming server over the first link to the proxy device, in response to any degradation that occurs on the second link between the proxy device and the end device. This can maximise the Quality of Experience of the end user, and optimise the battery life of the end device, and also avoid unnecessary transmission of packets that are not received by the headset.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the methods described above in respect of FIGS. 5 to 8.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for controlling communications from a content server to an end device via a proxy device, wherein the content server has a connection to the proxy device over a first link using a streaming control protocol, and the proxy device also has a connection to the end device over a second link, the method comprising, at the end device:
   transmitting, from the end device, information to the proxy device about a context of the end device; and
   in response to the end device being instructed by the proxy device to make a decision about controlling transmissions from the content server to the end device via the proxy device, making by the end device said decision based on information relating to a Quality of Experience at the end device, wherein the instruction from the proxy device comprises a message requesting the end device to make an assessment as to whether transmissions from the content server over the first link should be controlled based on the Quality of Experience at the end device.

2. A method according to claim 1, comprising transmitting the information to the proxy device about the context of the end device in a field of a short-range wireless protocol message.

3. A method according to claim 2, wherein the short-range wireless protocol is Bluetooth.

4. A method according to claim 1, comprising transmitting the information relating to the Quality of Experience at the end device to the proxy device in a field of a short-range wireless protocol message.

5. A method according to claim 4, wherein the short-range wireless protocol is Bluetooth.

6. A method according to claim 1, wherein the information relating to the Quality of Experience at the end device comprises information relating to time gaps between packets received at the end device.

7. A method according to claim 1, wherein the information relating to the Quality of Experience at the end device comprises information relating to a state of a buffer containing packets received at the end device.

8. A method according to claim 1, wherein the step of making said decision about controlling transmissions from the content server to the end device via the proxy device, based on information relating to the Quality of Experience at the end device comprises comparing at least one parameter relating to the Quality of Experience at the end device with a threshold value.

9. A method according to claim 1, further comprising, after making said decision about controlling transmissions from the content server to the end device via the proxy device, sending a notification over the second link to the proxy device for forwarding to the content server.

10. A method for controlling communications from a content server to an end device via a proxy device, wherein the content server has a connection to the proxy device over a first link using a streaming control protocol, and the proxy device also has a connection to the end device over a second link, the method comprising, in said proxy device:
   receiving from the end device information about a context of the end device;
   determining where a decision should be made about controlling transmissions from the content server to the end device via the proxy device; and
   in response to determining that the decision about controlling transmissions from the content server to the end device via the proxy device should be made in the end device, notifying the end device of the determination, wherein notifying the end device of the determination comprises sending, to the end device, a message requesting the end device to make an assessment as to whether transmissions from the content server over the first link should be controlled based on a Quality of Experience at the end device.

11. A method according to claim 10, comprising receiving the information from the end device about the context of the end device in a field of a short-range wireless protocol message.

12. A method according to claim 11, wherein the short-range wireless protocol is Bluetooth.

13. A method according to claim 10, comprising receiving the information relating to the Quality of Experience at the end device from the end device in a field of a short-range wireless protocol message.

14. A method according to claim 13, wherein the short-range wireless protocol is Bluetooth.

15. A method according to claim 10, further comprising:
   in response to determining that the decision about controlling transmissions from the content server to the end device via the proxy device should be made in the proxy device, and receiving from the end device said information relating to the Quality of Experience at the end device,
   applying said received information relating to the Quality of Experience at the end device to a machine learning model; and
   using an output of the machine learning model to determine how transmissions from the content server to the end device via the proxy device should be controlled.

16. A method according to claim 10, further comprising:
   in response to determining that the decision about controlling transmissions from the content server to the end device via the proxy device should be made in the proxy device, deciding whether transmissions from the content server to the end device via the proxy device should be adapted, and sending a signal to the content server to cause the transmissions from the content server to the end device via the proxy device to be adapted.

17. A method according to claim 16, comprising sending said signal to the content server in a message in said streaming control protocol.

18. A method according to claim 10, further comprising, in response to determining that the decision about controlling transmissions from the content server to the end device via the proxy device should be made in the content server, receiving information from the end device relating to a Quality of Experience at the end device, and forwarding the received information relating to the Quality of Experience at the end device to the content server.

19. A method according to claim 18, comprising receiving the information relating to the Quality of Experience at the end device from the end device in a field of a short-range wireless protocol message, and forwarding the received information to the content server in a message in said streaming control protocol.

20. A method according to claim 19, wherein the short-range wireless protocol is Bluetooth.

\* \* \* \* \*